United States Patent [19]

Suzuki

[11] 4,057,884
[45] Nov. 15, 1977

[54] TOOL HOLDER

[75] Inventor: Masakazu Suzuki, Sowa, Japan

[73] Assignee: Suzuki Iron Works Co., Ltd., Japan

[21] Appl. No.: 678,719

[22] Filed: Apr. 20, 1976

[30] Foreign Application Priority Data

Jan. 16, 1976   Japan .................................. 51-3900

[51] Int. Cl.² ........................................... B26D 1/00
[52] U.S. Cl. .................................................... 407/89
[58] Field of Search ...................................... 29/98, 96

[56] References Cited

U.S. PATENT DOCUMENTS

| 1,032,898 | 7/1912 | Hane | 29/98 |
| 1,282,984 | 10/1918 | Thompson | 29/98 |
| 2,248,931 | 7/1941 | Anania | 29/98 |
| 2,392,217 | 1/1946 | Anania | 29/98 X |
| 3,500,523 | 3/1970 | Cashman et al. | 29/96 |

Primary Examiner—Leonidas Vlachos
Attorney, Agent, or Firm—Wenderoth, Lind & Ponack

[57] ABSTRACT

A tool holder has a tool bit supporting member for releasably securing a tool bit of hard material thereon, a shank for pivotally mounting the tool bit supporting member at the forward end thereof, and an indexing device for the indexing relative angular position of the shank and the tool bit supporting member.

3 Claims, 4 Drawing Figures

U.S. Patent Nov. 15, 1977 4,057,884
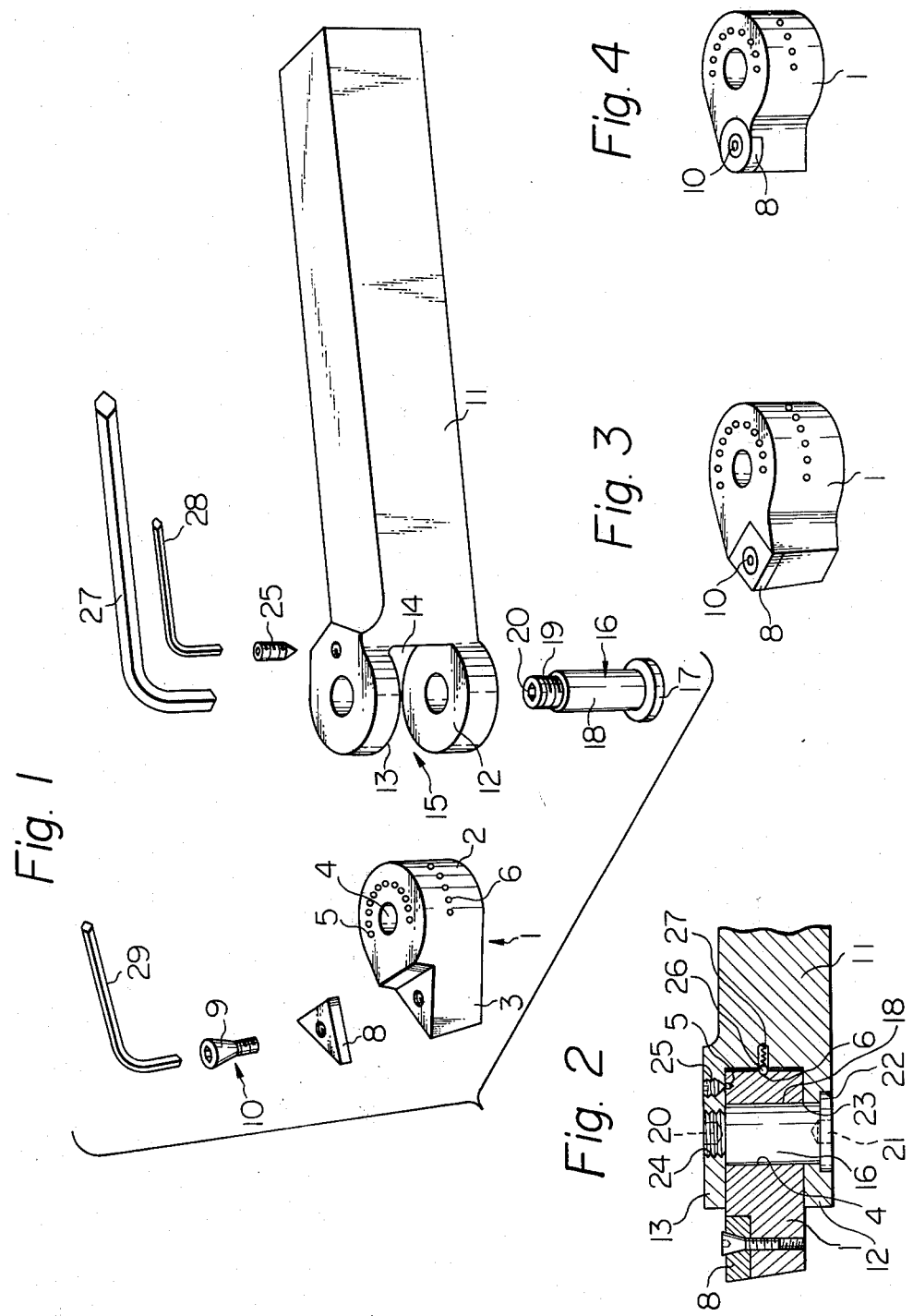

TOOL HOLDER

This invention relates to a tool holder for supporting and holding a tool bit or a tip formed of hard material such as cemented carbide or the like for use in cutting operations.

According to the present invention, there provided a tool holder comprising a tool bit supporting member having a generally cylindrical body portion and a tool bit supporting portion projecting from the side surface of the body portion and defining an upper surface for releasably supporting a tool bit, a shank having a recess at the forward end thereof and vertically spaced limbs for slidably engaging with the upper and lower surfaces of the body portion, a bolt extending between the lower and upper limbs and through the cylindrical body portion for pivotally supporting and securing the tool bit supporting member relative to the shank, and index means for indexing pivotal movement of the tool bit supporting member relative to the shank.

Preferably, the index means includes an adjusting screw engaging with the upper limb of the shank and having a free end for engaging with one of a plurality of angularly spaced indexing recesses formed in the upper surface of the cylindrical body portion of the tool bit supporting member.

The foregoing and other objects and advantages of the present invention will be readily apparent to those skilled in the art from the following description taken together with the accompanying drawings, in which:

FIG. 1 is a perspective exploded view showing a tool holder according to the present invention;

FIG. 2 is a longitudinal cross-section of the essential portion of the tool holder of FIG. 1;

FIG. 3 is a perspective view of a modified form of the tool bit and the tool bit supporting member of FIG. 1; and FIG. 4 is a view similar to FIG. 3, but showing another modified form.

Referring particularly to FIGS. 1 and 2, the tool bit supporting member 1 comprises a generally cylindrical body portion 2 having a tool bit supporting portion 3 projecting from side surface of the body portion 2. The tool bit supporting portion 3 is adapted to support a triangular tool bit 8 on the top surface thereof, and, for this purpose, a screw 10 having a tapered head 9 engaging with a tapered opening in the tool bit 8 is threaded into the portion 3. The body portion 2 has a bore 4, a series of indexing recesses 5 disposed in the upper surface of the cylindrical portion 2 and a series of indexing recesses 6 formed in the peripheral side surface thereof.

Preferably, the tool bit 8 is formed of hard material such as cemented carbide, stellite or the like.

The tool bit supporting member 1 is received in a recess 15 formed in the forward end of an elongated shank 11. The recess 15 is between vertically spaced limbs 12 and 13 of the shank 1 having opposing flat surfaces respectively and an arcuate side surface 14. The opposing flat surfaces are adapted to slidably engage the upper and lower surfaces of the body portion 2. A tightening bolt 16 having a head portion 17, a shank portion 18, a threaded portion 19 and tool receiving recesses 20 and 21 extends through the bore 4 of the tool bit supporting member 2. The threaded portion 9 engages with a threaded bore 24 of the limb 13 for securing the tool bit supporting member 1 between the limbs 12 and 13.

As shown in FIG. 2, the diameter of the bore 4 of the tool bit supporting member 1 and that of the bore 23 of the lower limb 12 of the shank 11 are substantially equal to the diameter of the shank 18 of the bolt 16. The bore 23 is counterbored from bottom to provide a bore 22 for receiving the head portion 17 of the bolt 16. Thus, the head portion 17 of the bolt 16 does not project from the under surface of the shank 11, thereby increasing the application of the tool holder when mounting the same on a tool carriage. Hexagonal tool receiving recesses 20 and 21 are formed in the opposite ends of the bolt 16 for receiving a tightening or loosening tool 27 either from above or below.

When the bolt 16 is not tightened, the tool bit supporting member can rotate around the bolt 16 and, therefore, the tool bit 8 can be located at a desired angular position relative to the lengthwise direction of the shank 11, and thus, the tool holder can be utilized as a right handed tool or a left handed tool as desired.

For fixing the angular position of the tool bit 8 or the tool bit supporting member 1 relative to the shank 11, there is provided indexing means comprising the angularly spaced recesses 5 formed in the upper surface of the tool bit supporting member 1, and a position adjusting and fixing screw 25 threadingly engaging with the upper limb 13 of the shank 11 for selectively engaging one of the recesses 5 with a generally conical tip end as shown in FIG. 2.

In the embodiment shown in the drawing, the recesses 5 are spaced from each other at an angle of 15° over a range of 180°.

For facilitating the indexing operation utilizing the adjusting and fixing screw 25 and the recesses 5, the recesses 6 formed on the cylindrical side surface of the tool bit supporting member 1 cooperate with a ball 26 retained in a blind bore formed in the arcuate surface 14 of the shank 11. The ball 26 is urged by a spring 27 and projects a small distance from the arcuate surface 14. The location of the recesses 5 and 6 is such that when one of the recesses 6 is engaged by the ball 26, one of the recesses 5 is roughly aligned with the adjusting and fixing screw 25, whereby failure of the cone shaped tip end of the screw 25 to engage a recess 5 can be avoided.

The tool bit 8 shown in FIGS. 1 and 2 has the shape of a triangle, but as shown in FIGS. 3 and 4, the tool bit may have the shape of a square or a circle, or any other shape as required.

When the bolt 16 and the screw 25 are loosened by utilizing tools 27 and 28 respectively, the tip supporting member 1 can easily be rotated around the bolt 16 and one of the predetermined angular positions of the tip supporting member 1 relative to the shank 11 can easily be located by the engagement between the ball 26 and one of the recesses 6. The angular position is adjusted and fixed by tightening the adjusting and fixing screw 25, and engagement between the ball 26 and the recess 6 gives a rough indication of the angular position and avoids failure in the tip end of the screw 25 to engage a recess 5.

The tool holder according to the present invention having the construction as heretofore described can be utilized as a right-handed tool as well as a left-handed tool having a desired angular position and has a simple construction and sufficient strength and rigidity. Further, the under surface of the shank does not have any projecting portion, thus, it is easy to install the tool holder on a tool carriage.

The mounting screw 10 has a tapered head 9 engaging with the tip 8 for holding the tip 8 against the tip supporting portion 3, and the head portion of the screw 10 does not project from the upper surface of the tip 8 by an amount such that the head portion will prevent a heavy cutting operation by interfering with the chip.

In the drawing, the reference numeral 29 denotes a tool for tightening the screw 10, but preferably, the tool 29 is the same as the tool 28.

What is claimed is:

1. A tool holder comprising a tool bit supporting member having a generally cylindrical body portion having an axial bore therethrough and a tool bit supporting portion projecting from the side surface of the cylindrical body portion for releasably mounting a tool bit on the upper surface thereof, the upper surface of said cylindrical body portion having a plurality of indexing and fixing recesses therein angularly spaced around said bore and the peripheral side surface of said body portion having a plurality of rough indexing recesses therein angularly spaced around said surface, a shank having vertically spaced limbs at the forward end thereof defining a recess therebetween for slidably receiving therein the cylindrical body portion of the tool bit supporting member, a bolt extending vertically between the limbs of the shank and through said bore in the cylindrical body portion of the tool bit supporting member for pivotally mounting and securing the tool bit supporting member to the shank, an adjusting and fixing screw threadingly engaging with the upper limb of the shank and having a tip end for engaging selectively with one of the angularly spaced indexing recesses in the upper surface of the cylindrical body portion, and a ball mounted in the shank and urged resiliently against the peripheral side of said body portion for engaging in one of the angularly spaced rough indexing recesses in the side surface of the cylindrical body portion.

2. A tool holder according to claim 1, wherein the tip end of the adjusting and fixing screw is a tapered end surface and the indexing and fixing recesses in the upper surface of the body portion are recesses having a shape complementary to said tapered end surface.

3. A tool holder according to claim 1, wherein the tool bit has a countersunk hole therethrough, and said holder further comprises a flat head mounting screw threaded into the tool bit supporting portion of the tool bit and having a tapered head in said countersunk bore with the flat upper surface at least flush with the upper surface of said tool bit.

* * * * *